US006635703B1

(12) United States Patent
Purvis et al.

(10) Patent No.: US 6,635,703 B1
(45) Date of Patent: *Oct. 21, 2003

(54) VERY HIGH SOLIDS ADHESIVE

(75) Inventors: Daniel Charles Purvis, Temple, TX (US); John James, Temple, TX (US); John Paul Jones, Temple, TX (US)

(73) Assignee: Premark RWP Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/126,383

(22) Filed: Jul. 30, 1998

(51) Int. Cl.[7] .............................. C08K 3/22; C08K 5/10; C08K 5/07; C08K 5/05; C08K 5/01

(52) U.S. Cl. ..................... 524/433; 524/315; 524/365; 524/379; 524/475; 524/484

(58) Field of Search .................. 524/308, 310, 524/315, 379, 385, 386, 388, 389, 474, 475, 476, 484, 485, 486, 365, 433

(56) References Cited

U.S. PATENT DOCUMENTS

| | | | |
|---|---|---|---|
| 3,361,693 A | 1/1968 | Geschwind | 526/432 |
| 3,595,821 A | 7/1971 | Spector et al. | 428/514 |
| 3,754,712 A * | 8/1973 | Cecil | 241/16 |
| 3,806,028 A | 4/1974 | Coffey | |
| 3,896,059 A * | 7/1975 | Wakefield et al. | 525/237 |
| 3,950,291 A * | 4/1976 | Jurrens | 524/273 |
| 3,951,722 A * | 4/1976 | Howson et al. | 524/511 |
| 3,965,061 A | 6/1976 | Bash et al. | 524/271 |
| 4,057,655 A * | 11/1977 | Okada et al. | 426/583 |
| 4,401,271 A | 8/1983 | Hansen | 239/337 |
| 4,401,272 A | 8/1983 | Merton et al. | 239/337 |
| 4,485,200 A | 11/1984 | Perlinski et al. | 523/409 |
| 4,533,254 A | 8/1985 | Cook et al. | 366/176 |
| 4,783,389 A | 11/1988 | Trout et al. | 430/137 |
| 4,897,137 A | 1/1990 | Miller et al. | 156/157 |
| 5,066,522 A | 11/1991 | Cole et al. | 427/422 |
| 5,230,919 A * | 7/1993 | Walling et al. | 426/633 |
| 5,324,107 A * | 6/1994 | Tanaka et al. | 366/76.3 |
| 5,409,987 A * | 4/1995 | Kalwara et al. | 524/365 |
| 5,444,112 A | 8/1995 | Carnahan | 524/272 |
| 5,733,961 A | 3/1998 | Purvis II et al. | 524/433 |
| 5,856,397 A * | 1/1999 | Pope et al. | 524/447 |
| 5,894,095 A * | 4/1999 | DeMali | 73/862.27 |
| 6,293,754 B1 * | 9/2001 | Liang et al. | 416/1 |
| 6,352,730 B1 * | 3/2002 | Zimmerman et al. | 426/73 |

FOREIGN PATENT DOCUMENTS

| | | |
|---|---|---|
| CA | 2175604 | 7/1995 |
| CA | 2141500 | 8/1995 |
| CA | 2206715 | 12/1997 |
| DE | 3028693 | 2/1982 |
| EP | 1053791 A1 | 11/2000 |
| GB | 1211662 | 11/1970 |
| JP | 48-26378 | 8/1973 |
| JP | 49-25032 | 3/1974 |
| JP | 49-16104 | 4/1974 |
| JP | 51-7042 A | 1/1976 |
| JP | 52-30838 A | 8/1977 |
| JP | 54-30232 | 3/1979 |
| JP | 55-724 | 1/1980 |
| JP | 58-101173 A | 6/1983 |
| JP | 62205177 | 9/1987 |
| JP | 5-295336 | 11/1993 |
| JP | 01726593 | 5/1995 |
| JP | 8-134419 A | 5/1996 |
| JP | 08337765 | 12/1996 |
| JP | 45-22239 B | 7/1997 |
| JP | 10204398 | 4/1998 |

OTHER PUBLICATIONS

Skeist, Handbook of Adhesives, 1977, Nostrand Reinhold, New York, US XP002121193, pp. 343–362.

* cited by examiner

*Primary Examiner*—Peter A. Szekely
(74) *Attorney, Agent, or Firm*—Welsh & Flaxman LLC

(57) ABSTRACT

A method of making a contact adhesive includes the steps of mixing a solvent with a rubber blend and/or resin for making a contact adhesive and then processing the solvent/rubber/resin blend until a desired lowered viscosity is reached while obtaining a solids content of greater than 30 weight percent. The contact adhesive has a viscosity capable of allowing atomization of an adhesive which contains a solids content of greater than 30 weight percent.

9 Claims, No Drawings

VERY HIGH SOLIDS ADHESIVE

TECHNICAL FIELD

The present invention relates to processing polychloroprene contact adhesives and processes for making the same to improve their sprayability. The present invention more particularly relates to making high solids/high acetone containing polychloroprene contact adhesives that can be atomized for spraying.

BACKGROUND OF THE INVENTION

It has been generally known in the field of high solids contact adhesives that in order to comply with VOC regulations, contact adhesives would have to be either chlorinated solvent products or waterborne products.

The early contact adhesives which complied fully with the VOC regulations were chlorinated solvent based. However, the Montreal Protocol banned the use of methyl chloroform based on its potential as an upper atmosphere ozone formation retardant. This left only methylene chloride as a possible solvent for contact adhesives.

In 1997, the Hazardous Air Pollutants regulation, 40 C.F.R. Part 63 (the Wood Furniture NESHAP) made methylene chloride a hazardous air pollutant. Furthermore, on Jan. 10, 1997, the U.S. Office of Occupational Safety and Health (OSHA) issued a standard (29 C.F.R. Parts 1910, 1915 and 1926) which lowered the limit on worker exposure to methylene chloride. Based on these regulations, it appeared that the only alternative to these chemicals were waterborne contact adhesives.

In 1997, a third alternative became possible because of two factors. The first was the delisting of acetone as a Volatile Organic Compound (VOC) by the EPA. The second was the development of technology which enabled aerosolization of polychloroprene phenolic contact adhesives. A polychloroprene contact adhesive when coated on two materials, adheres to itself upon contact, after drying. Polychloroprene contact adhesives have been formulated in both solvent and waterborne systems. The materials upon which polychloroprene can be used include wood, plastic laminates, paper, glass, carbon filter, concrete, ceramics and metals such as iron, steel and aluminum.

There is a need for a polychloroprene contact adhesive that can be sprayed from an aerosol container in a uniform spray pattern. There is a further need for a polychloroprene contact adhesive that can be sprayed from a standard pressurized container with pressure regulator and/or valves and nozzles that are commercially available, for example, the Binks Spraypot.

It would therefore be useful to develop a polychloroprene contact adhesive which was made from high solids which makes it possible to accomplish more work per unit of adhesive. This also allows for less solvent evaporation into the air while completing the same amount of work. It would also be useful to develop a polychloroprene contact adhesive which surpasses the Wood Furniture NESHAP mandated Hazardous Air Pollutants (HAP) level of one pound HAP per pound of solids. The invention allows the creation of contact adhesives which contain HAP levels of less than 0.2 and possibly as low as zero HAP.

SUMMARY OF THE INVENTION

According to the present invention, a method of making a contact adhesive includes the steps of mixing a solvent with a rubber blend and/or resin for making a contact adhesive and then processing the solvent/rubber/resin blend until a desired lowered viscosity is reached while obtaining a solids content of not less than 30 weight percent. Also described is a high solid/high acetone contact adhesive made of a mixture of polychloroprene or a polychloroprene derivative and acetone.

DETAILED DESCRIPTION OF THE INVENTION

The present invention provides a method of making a contact adhesive and the contact adhesive per se. The method most generally includes the steps of first mixing a solvent with a rubber blend and resin to form a solvent/rubber/resin blend of the type to be used as a contact adhesive. The solvent/rubber/resin blend is processed until a desired lowering of the ASTM D 1084 Saybolt viscosity is reached, while achieving a solids content of greater than 30 weight percent. This process can be accomplished in multiple steps to raise the solids content while continuing to lower the viscosity to a desirable level well suited for spraying uses. High solids products make sense in an era of accelerating solvent prices and VOC regulations. With very high solids products it is possible to deliver more bonded area per gallon, thus less solvents evaporate into the air when performing a given amount of work. Since less solvents evaporate into the air per unit of adhesive sprayed the HAP and VOC levels are lowered. In addition, the increased solids content allows users to achieve a desired adhesion with less spray. Users, therefore, do not need to spray as long and thus again fewer pollutants are released.

In fact, The Wood Furniture NESHAP mandated a HAP level for existing regulated sources of 1 pound of HAP per pound of solids and new sources to 0.2 pounds of HAP per pound of solids. The contact adhesive of the present invention is capable of attaining HAP levels of 0.2 or less and VOC levels of less than 400 g/L.

More specifically, the solvent/rubber/resin blend can be made in a kettle type process well known in the art. Solvents of the type used in the present invention can be selected from the group including aromatics, ketones, aliphatics, alcohols and esters. The concentration of solvent can range from 35 to 70%, by weight.

Resins used with the present invention can be selected from the group including modified resins, polyterpene resins, phenolic resins, phenolic modified terpene resins, and aliphatic petroleum hydrocarbon resins. Preferably, phenolic resins are used. Broadly, the resins can range from 4 to 30 weight percent. More preferably, the resins range from 6 to 25 weight percent. The weight percent of resin relates linearly to the weight percent of solids. For example, the weight percent of resin in the adhesive is 14 when the solids level is 36% and 25 when the solids level is 65%.

The rubbers used are well known in the art. Preferably, the rubber used is a blend of polychloroprene synthetic rubbers in a broad concentration ranging from 8 to 40 weight percent. More preferably, the rubber concentration ranges from 10 to 36 weight percent. The preferred rubber concentration is 20 weight percent.

The total solids concentration is greater than 30 weight percent. Surprisingly, solids levels have ranged from 30% to 65%, previously unheard of levels. Also, unheard of levels of acetone have been able to be used in the same mixture. Acetone levels have exceeded 60% of solvent blend by volume, thus providing high solids and high acetone adhesives having Volatile Organic Compounds (VOC's) below the 250 g/L mandated by SCAQMD and even below the 200 g/L mandated by other California districts.

The processing step discussed above is most preferably accomplished by shearing the solvent/rubber/resin blend to achieve the desired viscosity. The shearing process is discussed in detail in U.S. Pat. No. 5,733,961 to Purvis II, et al., issued Mar. 31, 1998. The Purvis II, et al '961 patent is incorporated herein by reference. Generally, the processing step includes shearing in a Microfluidizer® processor utilizing an electrically driven, dual plunger or piston, hydraulic intensifier pump to pressurize the fuild product.

During the operation the solvent is mixed with rubber and/or resin in a kettle type process to form a blend and then introduced into the Microfluidizer® wherein the high pressure plungers/pistons in the pump shift back and forth forcing the blend out of one end of the pump, while drawing the blend into the other end. The pump's action forces the blend stream into the restricted orifice of the interaction chamber. The chamber's microchannels are geometrically fixed and the pathway is comparable in size to the cross section of a human hair. Once inside, the blend stream becomes highly pressurized and propels forward at speeds of up to hundreds of meters per second. It separates in two, changes direction and collides with itself into a single stream. There is incredible amount of energy being dissipated in an extremely short period of time creating shear, impact and cavitation. End particles and droplets will be dramatically reduced in size. Thereafter, if desired, more solvent, rubber and/or resin is added to the blend in a kettle type process and the new blend is introduced into the Microfluidizer® for further processing.

The product that enters the processing zone encounters no moving parts. There is nothing to fluctuate as the pressure accelerates or decelerates and thus cause inconsistencies from batch to batch. Additionally there are no crevices or obstacles to collect particles and complicate cleaning. Results are consistent and easily reproducible.

The particular type of polychloroprene which will be utilized depends upon the properties (e.g. flammability, oil resistance, toughness, extensibility, crystallization rate, resistance to crystallization, etc.) which are required in the contemplated use.

Commercially available tackifiers for polychloroprene contact adhesives include natural and modified resins, polyterpene resins, phenolic resins, phenolic modified terpene resins, and aliphatic petroleum hydrocarbon resins.

Metallic oxide, such as magnesium and zinc oxide, serves as acid acceptors by neutralizing the hydrochloric acid which is released upon the aging of polychloroprene, thereby minimize the deterioration of materials that come into contact with the polychloroprene contact adhesives. They serve, furthermore, as curing agents for the polychloroprene, thereby increasing the tensile strength of the resulting adhesive bonds, and also aid in the room temperature crosslinking.

The antioxidant prevents oxidation and discoloration. The following antioxidants have been disclosed as suitable for use in formulating polychloroprene contact adhesives: phenyl-alpha-naphthylamine, phenyl-beta-napthylamine, phenyl-beta-napthalene, and 2,2'-methylene-bis (4-methyl-6-tertiary butyl-phenol).

The desired lowering of the VOC is reached at a value of below 400 grams per liter. Preferably, the desired VOC is within the range of 200 to 400 grams per liter and in a preferred embodiment is 390 grams per liter. In accordance with the present invention, the processing step, especially using the shearing process of the present invention, can cause drops in viscosity of ten to over 70%. Thus, viscosity ranges allow for spraying via a pressurized canister or pressurized spraypot, as well as, aerosol spraying through small volume applications.

Examples of such aerosol spray mechanisms are disclosed in U.S. Pat. Nos. 4,401,272 and 5,444,112. The '272 patent discloses an aerosol spray nozzle structure which enables a formulation of aerosol adhesives based on soluble polychloroprene. However, the '272 patent discloses that the spray head permits an aerosol solids level as high as 11.1%. Utilizing the present invention, such aerosol spray nozzles can spray solids at concentrations well above 11.1%.

Depending on the amount of adhesive being used for a particular type of application, the adhesive prepared as described above may be packaged in unpressurized bulk containers like 55 gallon drums or 5 gallon pails. Bulk container adhesives can be applied with pressurized spray pot systems.

The present invention further provides a contact adhesive made by the above-described method. Most generally, the contact adhesive is a solvent/rubber/resin blend having a ASTM D 1084 Saybolt viscosity capable of atomizing and a solids content of greater than 30 weight percent.

EXAMPLES

The following tables provide examples of processes in resulting adhesive compositions made in accordance with the present invention. The processes demonstrate steps ranging from a single processing to multiple processing steps ranging to six additions of rubber and resin to the blend.

TABLE 1

36% solid adhesive    VOC ASTM D 3960 = 380 grams/liter

| 1st - Rubber Mix | | | | 2nd - Rubber & Resin | |
|---|---|---|---|---|---|
| % Solid Content | Mix Viscosity | Processed Viscosity | Drop in Viscosity | Mix % Solid Content | Mix Final Viscosity |
| 19 | 39.2 | 16.6 | 57.7% | 35.5 | 28.9 |

TABLE 2

40% solid adhesive    VOC ASTM D 3960 = 593 grams/liter

| 1st - Rubber Mix | | | |
|---|---|---|---|
| % Solid Content | Mix Viscosity | Processed Viscosity | Drop in Viscosity |
| 17.8 | 49.4 | 18.6 | 62.3% |

| 2nd - Rubber Mix | | | | 3rd - Rubber & Resin | |
|---|---|---|---|---|---|
| % Solid Content | Mix Viscosity | Processed Viscosity | Drop in Viscosity | Mix % Solid Content | Mix Final Viscosity |
| 26.5 | 77.3 | 16.5 | 78.7% | 39.4 | 28.4 |

TABLE 3

| 50% solid adhesive | VOC ASTM D 3960 = 365 grams/liter | | |
|---|---|---|---|
| 1st - Rubber Mix | | | |
| % Solid Content | Mix Viscosity | Processed Viscosity | Drop in Viscosity |
| 14.7 | 18.7 | 15.4 | 17.6% |
| 2nd - Rubber Mix | | | |
| % Solid Content | Mix Viscosity | Processed Viscosity | Drop in Viscosity |
| 27.9 | 166.6 | 25.7 | 84.6% |
| 3rd - Rubber Mix | | | |
| % Solid Content | Mix Viscosity | Processed Viscosity | Drop in Viscosity |
| 29.4 | 57.0 | 24.1 | 57.7% |
| 4th - Rubber & Resin | | | |
| % Solid Content | Mix Viscosity | Processed Viscosity | Drop in Viscosity |
| 49.2 | 56.8 | 32.9 | 42.1% |

TABLE 4

| 55% solid adhesive | VOC ASTM D 3960 = 242 grams/liter | | | | |
|---|---|---|---|---|---|
| 1st - Rubber Mix | | | | | |
| % Solid Content | Mix Viscosity | Processed Viscosity | Drop in Viscosity | | |
| 18.4 | 31.0 | 16.4 | 47.1% | | |
| 2nd - Rubber Mix | | | | | |
| % Solid Content | Mix Viscosity | Processed Viscosity | Drop in Viscosity | | |
| 26.8 | 74.2 | 16.8 | 77.4% | | |
| 3rd - Rubber Mix | | | | | |
| % Solid Content | Mix Viscosity | Processed Viscosity | Drop in Viscosity | | |
| 32.2 | 70.6 | 21.7 | 69.3% | | |
| 4th - Rubber & Resin | | | | | |
| % Solid Content | Mix Viscosity | Processed Viscosity | Drop in Viscosity | | |
| 38.6 | 0.0 | 0.0 | ERR | | |
| 5th - Rubber & Resin | | | 6th - Rubber & Resin | | |
| % Solid Content | Mix Viscosity | Processed Viscosity | Drop in Viscosity | Mix % Solid Content | Mix Final Viscosity |
| 43 | 0.0 | 0.0 | ERR | 55.0 | 0.0 |

TABLE 5

| 60% solid adhesive | VOC ASTM D 3960 = 230 grams/liter | | | | |
|---|---|---|---|---|---|
| 1st - Rubber Mix | | | | | |
| % Solid Content | Mix Viscosity | Processed Viscosity | Drop in Viscosity | | |
| 20.8 | 66.1 | 17.8 | 73.1% | | |
| 2nd - Rubber Mix | | | | | |
| % Solid Content | Mix Viscosity | Processed Viscosity | Drop in Viscosity | | |
| 28.3 | 119.4 | 24.1 | 79.8% | | |
| 3rd - Rubber Mix | | | | | |
| % Solid Content | Mix Viscosity | Processed Viscosity | Drop in Viscosity | | |
| 34.1 | 80.3 | 19.7 | 75.5% | | |
| 4th - Rubber & Resin | | | | | |
| % Solid Content | Mix Viscosity | Processed Viscosity | Drop in Viscosity | | |
| 39.7 | 0.0 | 0.0 | ERR | | |
| 5th - Rubber & Resin | | | 6th - Rubber & Resin | | |
| % Solid Content | Mix Viscosity | Processed Viscosity | Drop in Viscosity | Mix % Solid Content | Mix Final Viscosity |
| 45.0 | 0.0 | 0.0 | ERR | 60.0 | 0.0 |

TABLE 6

| % Solid Content | Mix Viscosity | Processed Viscosity | Drop in Viscosity |
|---|---|---|---|
| 1st - Rubber Mix | | | |
| 19.9 | 47.0 | 16.2 | 65.5% |
| 2nd - Rubber Mix | | | |
| 28.4 | 76.5 | 18.2 | 76.2% |
| 3rd - Rubber Mix | | | |
| 34.2 | 0.0 | 0.0 | ERR |
| 4th - Rubber & Resin | | | |
| 39.4 | 0.0 | 0.0 | ERR |
| 5th - Rubber & Resin | | | |
| 45.0 | 0.0 | 0.0 | ERR |
| Mix % Solid Content | | Mix Final Viscosity | |
| 6th - Rubber & Resin | | | |
| 65.0 | | 0.0 | |

A specific example of the present invention is the 830 Lokweld® extremely flammable very high solids spray grade contact adhesive. The 830 adhesive is a blend of polychloroprene synthetic rubbers and phenolic resins in a solvent system of toluene, acetone, naptha, and cyclohexane. The 830 adhesive has a very high solids content of 36% by weight as compared to more typical flammable products having 17.5% to 18% solids by weight.

The 830 adhesives has a red color, viscosity of 900±400 cps and at 7.4 lbs. per gallon. Solid contents weight precent is 36.0±1.0. The coverage obtained by the adhesive is approximately 241 bonded square feet per gallon, at a rate of 2.5 dry grams per square foot.

Utilizing the 830 adhesive, one gallon is sufficient to cover 482 square feet of area or to bond 241 square feet of High Pressure Decorative Laminate (HPDL) to 241 square feet of substrate at a coverage rate of 2.5 dry grams of adhesive per square foot on each surface.

This adhesive is made in accordance with the present invention and defines excellent utility in the areas of woodworking, especially in the area of bonding laminates and non-metallic substrates, such as particle board, plywood, or laminate.

Examples of equipment used for application of such an adhesive are as follows:

| RECOMMENDED EQUIPMENT | | |
|---|---|---|
| GUN | FLUID TIP | AIR CAP |
| Blinks | 66ss | 66SD-3 |
| Model 95 | | |
| Model 7B/C | | |
| Model 62 | | |
| Model 18ss | | |
| Model 69 | | |
| 2001 ss | | |
| 2001 | | |
| DeVilbuss | FF | 797 |
| JGA-510 | | |
| MSA-510 | | |
| AUTOMATIC SPRAY | | |
| Binks | 66ss | 66SD-3 |
| Model 61 | | |
| DeVilbuss | | |
| AGX 510 | FF | 797 |

For an air source, continuous 80–100 psi source is used at 20 cubic feet per minute at the nozzle. Fluid pressure should be afforded 12–14 psi and a pump pressure should be 30–50 psi.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described.

What is claimed is:

1. A method of making a contact adhesive, comprising the steps of:
    mixing one or more of a solvent, a mixture of rubbers, and a tackifying resin to form a blend for making a contact adhesive; and
    processing the blend until a predetermined lowering of viscosity is reached and obtaining a final solids content of greater than 30 weight percent, the step of processing including shearing the blend in a high pressure shearing device which reduces end particles and droplets in size to thereby lower the viscosity of the blend sufficiently for subsequent spraying, wherein the resulting contact adhesive has a predetermined VOC of less than 400 grams per liter.

2. The method according to claim 1, further includes the steps of:
    adding additional rubber or tackifying resin to the blend after the processing step;
    further processing the blend containing the additional rubber or tackifying resin until a predetermined viscosity is reached, the step of further processing including shearing the blend in a high pressure shearing device which reduces end particles and droplets in size to thereby lower the viscosity of the blend sufficiently for subsequent spraying; and
    repeating the adding and further processing steps until the predetermined lowering of viscosity is reached and obtaining a final solids content of greater than 30 weight percent.

3. The method according to claim 1, further includes the steps of:
    adding additional rubber and tackifying resin to the blend after the processing step;
    further processing the blend containing the additional rubber and tackifying resin until a predetermined viscosity is reached, the step of further processing including shearing the blend in a high pressure shearing device which reduces end particles and droplets in size to thereby lower the viscosity of the blend sufficiently for subsequent spraying; and
    repeating the adding and further processing steps until the predetermined lowering of viscosity is reached and obtaining a final solids content of greater than 30 weight percent.

4. The method of claim 1, wherein said processing step reduces the viscosity by at least 10 percent.

5. The method of claim 1 wherein the rubber is a blend of polychloroprene synthetic rubbers.

6. The method of claim 1 wherein said resin is a phenolic resin.

7. The method of claim 1 wherein said solvent is selected from the group consisting of aromatics, ketones, aliphatics, alcohols and esters.

8. The method according to claim 1, wherein the contact adhesive is a mixture of polychloroprene rubber, phenolic resin, toluene, acetone, naphtha, and cyclohexane.

9. A contact adhesive manufactured by the process of claim 1, comprising:
    a solvent/rubber/tackifying resin blend having viscosity capable of atomizing and a solids content of greater than 30 weight percent, said organic solvent is selected from the group consisting of aromatics, ketones, aliphatics, alcohols and esters, and has an acetone concentration at a level greater than 60 percent of solvent blend by volume, wherein the contact adhesive has a predetermined VOC of less than 400 grams per liter.

* * * * *